United States Patent [19]

Storey et al.

[11] Patent Number: 5,128,059
[45] Date of Patent: Jul. 7, 1992

[54] RING-ALKYLATED M-PHENYLENE DIAMINE BLENDS FOR USE IN CURING EPOXY RESINS

[75] Inventors: Robson F. Storey, Hattiesburg; Arthur C. Bayer, Ocean Springs, both of Miss.; Sudhakar Dantiki, Toledo, Ohio

[73] Assignees: First Chemical Corporation, Pascagoula; The University of Southern Mississippi, Hattiesburg, both of Miss.

[21] Appl. No.: 759,995

[22] Filed: Sep. 13, 1991

Related U.S. Application Data

[62] Division of Ser. No. 314,126, Feb. 23, 1989, Pat. No. 5,049,639.

[51] Int. Cl.[5] .............................................. C08G 59/50
[52] U.S. Cl. ............................... 252/182.13; 528/120; 528/124; 528/407; 525/504
[58] Field of Search .................. 252/182.13; 528/120, 528/124, 407; 525/504

[56] References Cited

U.S. PATENT DOCUMENTS

| | | | |
|---|---|---|---|
| 2,853,467 | 9/1958 | Bloom et al. | 528/120 |
| 2,891,927 | 3/1956 | Philipson | 528/120 |
| 3,546,169 | 12/1970 | Cole | 528/124 |
| 3,637,514 | 1/1972 | Spatz et al. | 528/120 |
| 3,647,702 | 5/1972 | Cole | 528/124 |
| 3,732,239 | 5/1973 | Spatz et al. | 528/120 |
| 4,775,736 | 10/1988 | Wiggins | 528/120 |

OTHER PUBLICATIONS

"Properties of Epoxy Resins Cured with Ring-Alkylated M-Phenylenediamines" ACS Symp Ser 367, Ch 14, pp. 182-198, R. F. Storey et al. (1988).

*Primary Examiner*—Melvin I. Marquis
*Assistant Examiner*—Frederick Krass
*Attorney, Agent, or Firm*—Breiner & Breiner

[57] ABSTRACT

Blends of diaminoisopropylbenzene (DAIBP) and diaminoethylbenzene (DAEB) are provided for curing epoxy resins. The cured epoxy resins have increased tensile strength and slightly lower glass transition temperatures as compared with resins cured with either diamine alone.

3 Claims, No Drawings

RING-ALKYLATED M-PHENYLENE DIAMINE BLENDS FOR USE IN CURING EPOXY RESINS

This is a division of application Ser. No. 07/314,126 filed Feb. 23, 1989 now U.S. Pat. No. 5,049,639.

FIELD OF INVENTION

This invention relates to the use of ring-alkylated m-phenylene diamine blends in curing epoxy resins. More particularly, a blend of diaminoisopropylbenzene (DAIPB) and diaminoethylbenzene (DAEB) is utilized in curing epoxy resins.

BACKGROUND OF INVENTION

Various curing agents are known in the art for use in epoxy resin systems, such as aliphatic polyamines, polyamides, amido-amines, cycloaliphatic amines, certain anhydrides, phenol-formaldehyde, urea-formaldehyde, melamine-formaldehyde and aromatic amines.

Aromatic diamines have been in use for many years as curing agents for epoxy resins. They were originally introduced to increase the glass transition temperature (Tg) of the cured resins in order to impart increased dimensional stability at elevated temperatures. In addition, aromatic diamines have been found to provide long pot lives. The cured epoxy resins produced using aromatic diamines have good physical properties and good resistance to solvents and chemicals.

The aromatic diamines most widely used for curing epoxy resins are m-phenylene diamine (MPD), methylene dianiline (MDA) and diaminodiphenylsulfone (DADS). In the aerospace industry, DADS is a preferred curing agent in producing epoxy composite matrix resins due to the 30° C.–40° C. temperature increase in the heat distortion temperature which is imparted when DADS is utilized as compared to the temperature achieved with either MPD or MDA. In other applications, however, MPD or MDA are preferred because they are less expensive and require a less energetic cure schedule. Further, MPD and MDA are preferred since liquid curing agents are normally preferred over solid curing agents. MPD and MDA are commonly marketed as an eutectic mixture which is liquid at room temperature. Recently, however, MDA and MPD have come under an increasing attack due to their high toxicity. In fact, MDA has been found to produce cancer in laboratory rats. Accordingly, a need has arisen for new aromatic diamines which can serve as replacements for MDA and/or MPD/MDA eutectic mixtures without causing detrimental effects in the cured epoxy resins.

One means discovered for lowering the toxicity of aromatic diamines is to introduce ring substituents which can be readily metabolized, such as to a carboxylic acid. One example of this type of curing agent is trimethylene glycol di-p-aminobenzoate which, upon ingestion, is hydrolyzed to produce a non-toxic p-aminobenzoic acid. Due to the drastic departure from the basic MDA or MPD structure, however, changes in the performance properties of the cured epoxy resins have occurred thereby making the amino-benzoate an unsatisfactory curing agent for many applications.

In an article entitled "Properties Of Epoxy Resins Cured With Ring-Alkylated M-Phenylene Diamines", ACS Symp. Ser. 367, Ch. 14, pgs. 182-198, R. F. Storey et al (1988), the curing of epoxy resins with individual ring-alkylated MPDs was reported. These compounds are believed to be less toxic than MDA or MPD due to the presence of the alkyl group which is readily oxidizable in the body to produce the diamino benzoic acid. The individual ring-alkylated MPDs considered in the article were toluene diamine (TDA), diaminoethylbenzene (DAEB), diaminoisopropylbenzene (DAIPB), and diamino-tertbutylbenzene (DATBB). The alkyl group was also found to impart a significant lowering of the melting point as compared with that of MPD. For example, DATBB is a liquid and DAIPB is a soft solid at room temperature. Branched alkyl groups are preferred since they are suitable for use in Friedel-Crafts alkylation reactions and since they are less likely to cause internal plasticization in the cured resins. Larger alkyl substituents, such as isopropyl or tert-butyl, were found to increase the Tg of the cured resins. The most significant disadvantage in using the ring-alkylated MPDs was a 30%-35% loss of tensile strength in the cured resins as compared to that of MPD. It was shown that this loss was not due to an incomplete cure, which could conceivably have been caused by the steric bulk of the ring substituent, but rather appears to be due to the physical presence of the large alkyl group within the crosslinked network.

Due to the several disadvantages associated with the ring-alkylated MPDs, alternatives have been sought to increase the tensile strength of cured resins. Accordingly, it has been discovered that certain blends of ring-alkylated diamines combine synergistically to yield cured resin tensile strengths comparable to MPD and much higher than either ring-alkylated diamine when used alone. In particular, various blend ratios of DAIPB and DAEB have been found to provide cured epoxy resins which display an increased tensile strength and slightly lower glass transition temperatures as compared to epoxy resins cured with either DAIPB or DAEB alone. Blends of DAIPB and DAEB are also advantageously present as eutectic liquids at room temperature.

OBJECTS AND GENERAL DESCRIPTION OF INVENTION

It is the primary object of the present invention to provide blends of the ring-alkylated diamines DAIPB and DAEB which are useful as curing agents in producing cured epoxy resins wherein the cured resins have good tensile strength and appropriate glass transition temperatures.

It is another primary object of the present invention to provide blends of DAIPB and DAEB which combine synergistically to yield cured epoxy resins having tensile properties comparable to that of MPD and higher than those of either DAIPB or DAEB when used alone.

It is another primary object of the present invention to provide blends of DAIPB and DAEB which are eutectic liquids at room temperature.

The objects of the present invention are accomplished by providing blends or mixtures of DAIPB and DAEB wherein DAEB is present in an amount of at least 5 weight percent and up to about 80 weight percent of the mixture. Preferably, the amount of DAEB will be from about 20 to 40 weight percent. The DAIPB and DAEB combine synergistically when used as epoxy resin curing agents to provide a cured resin having properties comparable to those achieved when using MPD as a curing agent.

The discovery of the synergistic effect provided by the blends of this invention is particularly surprising since the use of either DAIPB or DAEB alone does not produce cured epoxy resins having the tensile strength and glass transition temperatures achieved when using MPD as a curing agent. While MPD is one of the most widely used aromatic diamine curing agents, it is presently causing considerable industry concern due to the potential human toxicity of the compound.

The diamines useful according to this invention have the following structural formula:

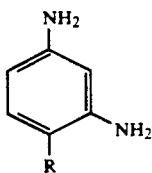

wherein R is $-CH_2CH_3$ (DAEB) or $-CH(CH_3)_2$ (DAIPB). The blends of DAIPB and DAEB are suitable for curing any of the epoxy resin systems as known and practiced by one skilled in the art.

More specifically, suitable epoxy resins for use in accordance with the present invention include the diglycidyl ether of bisphenol-A (DGEBA) marketed, for example, under the trade name DER 332 by Dow Chemical Company and having the structural formula:

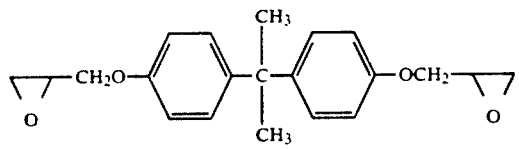

and an equivalent weight of 172.1. Additional suitable epoxy resins include commercially available polyepoxy compounds, particularly the diepoxy compounds, as are obtained through the reaction of polynuclear phenols, particularly bisphenol A or phenol novolaks and epichlorohydrin. Optionally, other epoxy resins, for example those based on polyols, can be used. Products of the latter type are known to one skilled in the art and are described in the literature. Specific examples of suitable resins include mononuclear aromatic glycidyl and glycidyl ether resins; polynuclear aromatic glycidyl ether epoxy resins; aromatic glycidyl epoxy resins; triazine based glycidyl and glycidyl ether epoxy resins; fluorinated glycidyl ether epoxy resins; cyano glycidyl ether epoxy resins; and glycidyl amine and glycidyl sulfonamide epoxy resins.

PRESENTLY PREFERRED EMBODIMENTS

The following examples illustrate the invention without limiting its scope.

(1) Procedure utilized in Examples 1-6.

The epoxy resin DGEBA is heated using a circulating air oven set at a temperature of 85° C. Excess amounts of the individual diamines, DAIPB and DAEB, are heated just to melting in a sealed container.

Appropriate amounts of the liquified diamines are then combined. The amounts are determined on the basis of weight percent with the combination present being equal to 100 weight percent (wt. %). In the blends of the invention, the DAEB is present in an amount of at least 5 wt. % and up to about 80 wt. %. Accordingly, the DAIPB is present in a complementary amount to DAEB to equal 100 wt. %.

Following the combination of the appropriate amount of liquified diamines, a stoichiometric equivalent amount of the epoxy resin is then added thereto. Thereafter, the components are mixed thoroughly. The mixture is evacuated at 60° C. following the mixing of the components for 15 minutes to remove air bubbles. The reaction mixture is then poured into a glass mold heated to 85° C. The mold was prepared in advance by lightly spraying the inner surfaces of the mold with a release agent. It was determined that the prepared mold should be baked for at least two hours in advance of curing to obtain proper conditioning of the glass surfaces. Samples were cured in the mold for two hours at 85° C. followed by two hours at 150° C. After curing, the samples were removed from the mold and machined to ASTM D638 specifications and stored in a desiccator until they were to be used.

The tensile properties of the cured epoxy resins were determined according to ASTM D638 using an Instron tensile tester equipped with a 500 kg load cell.

Glass transition temperatures (Tg's) of the cured resins were determined using a DuPont DSC 910 attached to a 9900 data analysis system. All samples were scanned under nitrogen atmosphere at a rate of 10° C./min.

Densities of the cured resins were obtained by accurately weighing rectangular solids which were precision-machined from expended tensile specimens. Approximate dimensions of the specimens were 1 cm. × 1 cm. × 0.32 cm. Accurate dimensional measurements were obtained using a micrometer.

(2) Procedure utilized in Example 7

Example 7 is a comparison example utilizing MPD to cure the epoxy resin DGEBA. The same procedure as described above for Examples 1-6 was utilized with the exception that 100 wt. % of MPD was mixed with DGEBA rather than DAIPB and/or DAEB.

(3) Results of Examples 1-7

The tensile properties and Tg's of the cured epoxy resins of Examples 1-7 are set forth in Table I below.

TABLE I

| | Mechanical Properties of Epoxy Resins Cured With DAIPB/DAEB Blends | | | | |
|---|---|---|---|---|---|
| | DAIPB/ | | Tensile Property | | |
| Example No. | DAEB (wt/wt) | Tg °C. | T.S. psi. × $10^{-3}$ | Elongation % | Modulus psi. × $10^{-5}$ |
| 1 | 100/0 | 167 | 7.8 | 3.4 | 3.0 |
| 2 | 90/10 | 155 | 8.5 | 3.2 | 3.1 |
| 3 | 80/20 | 161 | 9.6 | 4.6 | 2.9 |
| 4 | 70/30 | 154 | 11.9 | 5.6 | 3.0 |
| 5 | 60/40 | 157 | 10.4 | 4.1 | 3.1 |
| 6 | 0/100 | 163 | 8.5 | 3.5 | 3.0 |
| 7 | MPD | 167 | 11.9 | 5.7 | 2.8 |

The results set forth in Table I show a steady increase in the tensile strength of the cured epoxy resins as the proportion of DAEB is increased. The maximum tensile strength of $11.9 \times 10^{-3}$ psi occurs in Example 4 with 70/30 (wt/wt) of DAIPB/DAEB. This represents a 40%-50% improvement in strength when compared to epoxy resins produced using either diamine alone, see examples 1 and 6.

Additionally, the 70/30 blend of DAIPB and DAEB produces strength, elongation and modulus values virtually identical to those attained with MPD which is viewed by the industry as providing very acceptable properties in cured resins. The reason for this surprising synergistic effect is presently unknown. Tg's obtained in the cured resins when using the blends of DAIPB and DAEB were slightly depressed by 4%-8% in relation to those provided in resins cured with the individual diamines and MPD. However, no definite trend was discerned.

As shown in Table II below, the densities of the epoxy resins produced utilizing DAIPB/DAEB blends were all found to be approximately the same and virtually identical to that obtained with MPD.

TABLE II

Densities of Epoxy Resins Cured With DAIPB/DAEB Blends

| Example No. | DAIPB/DAEB (wt/wt) | Density g/cm$^3$ |
|---|---|---|
| 1 | 100/00 | 1.13 |
| 2 | 90/10 | 1.17 |
| 3 | 80/20 | 1.16 |
| 4 | 70/30 | 1.16 |
| 5 | 60/40 | 1.16 |
| 6 | 0/100 | 1.17 |
| 7 | MPD | 1.16 |

It was found that when the mixtures of DAIPB and DAEB contained DAEB in an amount of from approximately 10 wt. % to 40 wt. % that the mixtures were present as true eutectic solutions rather than as supercooled liquids. These mixtures have remained as liquids at room temperature for over one year. Accordingly, a preferred blend of DAIPB/DAEB is when DAEB is present in an amount from about 10-40 wt. %.

As will be apparent to one skilled in the art, various modifications can be made within the scope of the aforesaid description. Such modifications being within the ability of one skilled in the art form a part of the present invention and are embraced by the appended claims.

It is claimed:

1. A blend for use in producing cured epoxy resins comprising from about 20 to 95 weight percent of diaminoisopropylbenzene and from about 5 to 80 weight percent of diaminoethylbenzene.

2. A blend according to claim 1 wherein said blend is an eutectic liquid at room temperature.

3. A blend according to claim 1 wherein said diaminoethylbenzene is present in an amount of from about 20 to 40 weight percent.

* * * * *